United States Patent
Konuma et al.

(10) Patent No.: US 7,724,653 B2
(45) Date of Patent: May 25, 2010

(54) TRANSMISSION DEVICE AND REDUNDANT CONFIGURATION BETWEEN TRANSMISSION DEVICE AND LAYER 2 SWITCH

(75) Inventors: Youichi Konuma, Kawasaki (JP); Koichi Saiki, Kawasaki (JP); Junichi Shimada, Kawasaki (JP); Akira Miyasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 11/905,376

(22) Filed: Sep. 28, 2007

(65) Prior Publication Data

US 2008/0089226 A1  Apr. 17, 2008

Related U.S. Application Data

(63) Continuation of application No. PCT/JP2005/006371, filed on Mar. 31, 2005.

(51) Int. Cl.
*H04J 1/16* (2006.01)
(52) U.S. Cl. .................................. 370/220; 370/225
(58) Field of Classification Search .......... 370/219, 370/360, 220, 225; 335/4
See application file for complete search history.

(56) References Cited

U.S. PATENT DOCUMENTS 7,307,947 B2 * 12/2007 Okuno ..................... 370/222

2006/0002704 A1 * 1/2006 Jasti ............................ 398/12
2007/0207591 A1 * 9/2007 Rahman et al. ............. 438/439

FOREIGN PATENT DOCUMENTS

| JP | 2000-151674 | 5/2000 |
|---|---|---|
| JP | 2002-026956 | 1/2002 |
| JP | 2003-018196 | 1/2003 |
| JP | 2004-179723 | 6/2004 |
| JP | 2004179723 | * 6/2004 |
| JP | 2004349764 | * 10/2004 |
| JP | 2004-349764 | 12/2004 |

* cited by examiner

*Primary Examiner*—Andrew Lee
*Assistant Examiner*—William Trost

(57) ABSTRACT

A transmission device is connected to a layer 2 switch through a transmission path at one side, and to a relay transmission path at the other side. The transmission path includes a transmission path of a active system and a transmission path of a stand-by system. When failure occurs in the transmission path of the active system, the transmission device forcibly shuts down the transmission path of the active system upon detection of link down, to stop packet transmission, and causes the layer 2 switch to perform MAC address flush. The transmission device then switches the transmission path of the stand-by system to the active system, and transmits packets through the transmission path that has become the active system as a result of switching. The layer 2 switch performs MAC address learning to set a port, thereby maintaining communication even after occurrence of the failure.

18 Claims, 14 Drawing Sheets

TRANSMISSION DEVICE AND REDUNDANT CONFIGURATION BETWEEN TRANSMISSION DEVICE AND LAYER 2 SWITCH

CROSS-REFERENCE TO RELATED APPLICATIONS

This is a continuation application of International Application Number PCT/JP2005/006371, which was filed on Mar. 31, 2005.

BACKGROUND OF THE INVENTION

1. Field of the Invention

The present invention relates to a transmission device and a redundant configuration between the transmission device and a layer 2 switch.

2. Description of the Related Art

With recent high speed data communication in wide area networks (WAN), demand for services with layer 2, which is low cost and easy to manage, is increasing. For the layer 2 service, a layer 2 switch is used (for example, Japanese Patent Laid-Open Publication No. 2003-18196). The layer 2 switch is constituted by an input/output port, a media access control (MAC) processing unit, a switch processing unit, and a MAC address table. The layer 2 switch has a virtual bridged local-area-network (VLAN) function and a learn function for learning information (MAC address) about layer 2 (data link layer), and makes determination on frame transfer processing.

In a switching hub, which is commonly used as a layer 2 switch, the input/output port is connected to a WAN or a host, and data is communicated there between. The MAC address processing unit extracts a destination MAC address from a packet that is received through the input/output port, and sends the destination MAC address to the MAC address table. The MAC address table specifies an input/output port through which data is output based on the destination MAC address. The MAC address processing unit sends the packet to the switch processing unit and causes the switch processing unit to output the packet from the specified input/output port.

A layer 2 switch used for wide-area layer 2 network services that are provided mainly by communication carriers is connected to a terminal device or the like of a subscriber through a transmission path at one side, and to a wide-area layer 2 network through a transmission device at the other side of an input/output port. The layer 2 switch and the transmission device are installed at one station. Other stations have the same configuration. When connection is established between distant places through a transmission device in this manner, measures against failure, such as disconnection of the transmission path, are required, to maintain stability and reliability of the services.

A technique has been proposed in which more than one operating path are provided between network devices, and a different route is used when failure occurs in one operating path (for example, Japanese Patent Laid-Open Publication No. 2002-26956). Moreover, a technique has been proposed in which a MAC address table is managed, and when inconsistency with an actual connection state is found in the MAC address table due to failure in connection with an external device or the like, the MAC address table is appropriately updated to prevent network load increases caused by retransmission of packets and the like (for example, Japanese Patent Laid-Open Publication No. 2000-151674).

FIG. 12 is a schematic diagram illustrating a conventional redundant configuration using plural layer 2 switches. The redundant configuration shown in FIG. 12 is an original configuration by a layer 2 switch manufacturer. Layer 2 switches 53 and 54 are connected to a plurality of ports 51a and 51b of a transmission device 50, respectively. The layer 2 switch 53 is used as a master and the layer 2 switch 54 is used as a slave, and the redundant configuration with two transmission paths 55a and 55b is established. These master/slave layer 2 switches 53 and 54 are connected to a single layer 2 switch 56 to be connected to a subscriber. The layer 2 switch 56 has a hot standby function, and enables switching of transmission paths to the transmission path 55b if transmission path is disconnected due to failure occurred at a point X on the transmission path 55b.

FIG. 13 is a schematic diagram for explaining link aggregation by the layer 2 switch. The link aggregation is defined by IEEE 802.1ad, and is a function of obtaining a line speed faster than the physical speed of a single line by using more than one transmission path. Between two ports of the transmission device 50 and two ports of the layer 2 switch 53, two lines of the transmission paths 55 (55a, 55b) are connected. With this arrangement, a line speed twice as fast (for example, 2 GBit/sec) as the physical line speed of one transmission path (for example, 1 GBit/sec) can be obtained.

However, the layer 2 switch currently used by communication carriers for the layer 2 services is not equipped with a redundancy function of the transmission path to the transmission device. Therefore, if failure occurs in the transmission path between the transmission device and the layer 2 switch disconnecting the transmission line, service is stopped at once.

If it is configured to switch the disconnected transmission route to another route as the technique disclosed in Japanese Patent Laid-Open Publication No. 2002-26956, more than one transmission device and more than one wide area transmission path are required, resulting in increased installation cost and complicated operation and maintenance. In addition, the network devices must communicate control packets to monitor the condition of each other using a port of the network device that is on standby, and a function for performing a control process on the communicated control packets must be prepared in both of the network devices.

Furthermore, in the configuration shown in FIG. 12, three layer 2 switches 53, 54, and 56 are required. Since the number of devices increases, the installation cost increases. Moreover, when the transmission path is disconnected due to failure on the transmission path 55a, it is necessary to send disconnection information i to a transmission device 58 installed in a receiver station through a relay transmission path 57. Therefore, route switching within a section (station) cannot be performed.

If the route switch within a section cannot be performed, cost and labor for operation management increase due to the complicated network. FIG. 14 is a schematic of route switching when failure occurs. The configuration of the transmission device is omitted therein. A center station includes the master and slave layer 2 switches 53 and 54. When a plurality of terminal stations 60 (60a, 60b, ..., 60n) are connected to this center station, each of the terminal stations 60 is required to be connected to both of the master and slave layer 2 switches 53 and 54 through the transmission paths 57. Thus, the number of the transmission paths 57 increases, complicating the network structure. For example, the terminal station 60a must be connected to the master and slave layer 2 switches 54 and 54 using two transmission paths 57a and 57c.

In addition, when the transmission 55a of the master layer 2 switch 53 is disconnected due to failure at the point X and the like, it is necessary to switch, in the center station, from the master to the slave, and further, it is necessary to switch from the master transmission path 57a to the slave transmission path 57b. Furthermore, if such failure occurs in the center station, the entire system in the transmission path 57 must be switched from the master to the slave. The center station must inform the switching of the transmission path 57 and the switching from the master to the slave to each of the terminal stations 60, complicating operation management.

Moreover, since the link aggregation function shown in FIG. 13 uses two lines of transmission paths, if one of the transmission paths 55, for example, the transmission path 55a, is disconnected due to failure, the communication speed is reduced by half. Therefore, it becomes impossible to obtain the prescribed line speed. Furthermore, since two ports in the layer 2 switch 53 to which the transmission path 55 is connected uses a single interface card 53a, if this interface card 53a breaks, the communication service is stopped at once.

As described above, from the view points of operation management and cost, a redundant configuration between a transmission device and a layer 2 switch is demanded such that the configuration is applicable to both Gigabit Ethernet (GbE) (registered trademark) and Fast Ethernet (FE) (registered trademark), and switching of routes between the transmission device and the layer 2 switch is not affected by the switching of other transmission paths, for example, relay transmission paths.

SUMMARY OF THE INVENTION

It is an object of the present invention to at least solve the above problems in the conventional technologies.

A transmission device according to one aspect of the present invention includes an interface unit that includes a plurality of ports that are connected to at least two systems of transmission paths between the interface unit and a layer 2 switch; and a switching unit that switches the systems between an active system and a stand-by system, and that sets the ports such that a port connected to a transmission path of one of the systems to the active system and a port connected to a transmission path of another one of the systems to the stand-by system. The switching unit switches, when failure occurs in the system connected to the port set to the active system, the stand-by system to the active system.

A method according to another aspect of the present invention is of forming a redundant configuration between a transmission device and a layer 2 switch with transmission paths of at least two systems. The method includes setting a port connected to a transmission path of one of the systems to an active system, and a port connected to a transmission path of another one of the systems to a stand-by system; and switching, when failure occurs in the system connected to the port set to the active system, the stand-by system to the active system.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings. In the embodiments, a redundant configuration between a transmission device that performs transmission between distant places and a layer 2 switch that provides a layer 2 service (within a section) is achieved. The present invention is not limited to the embodiments.

Figure 1:
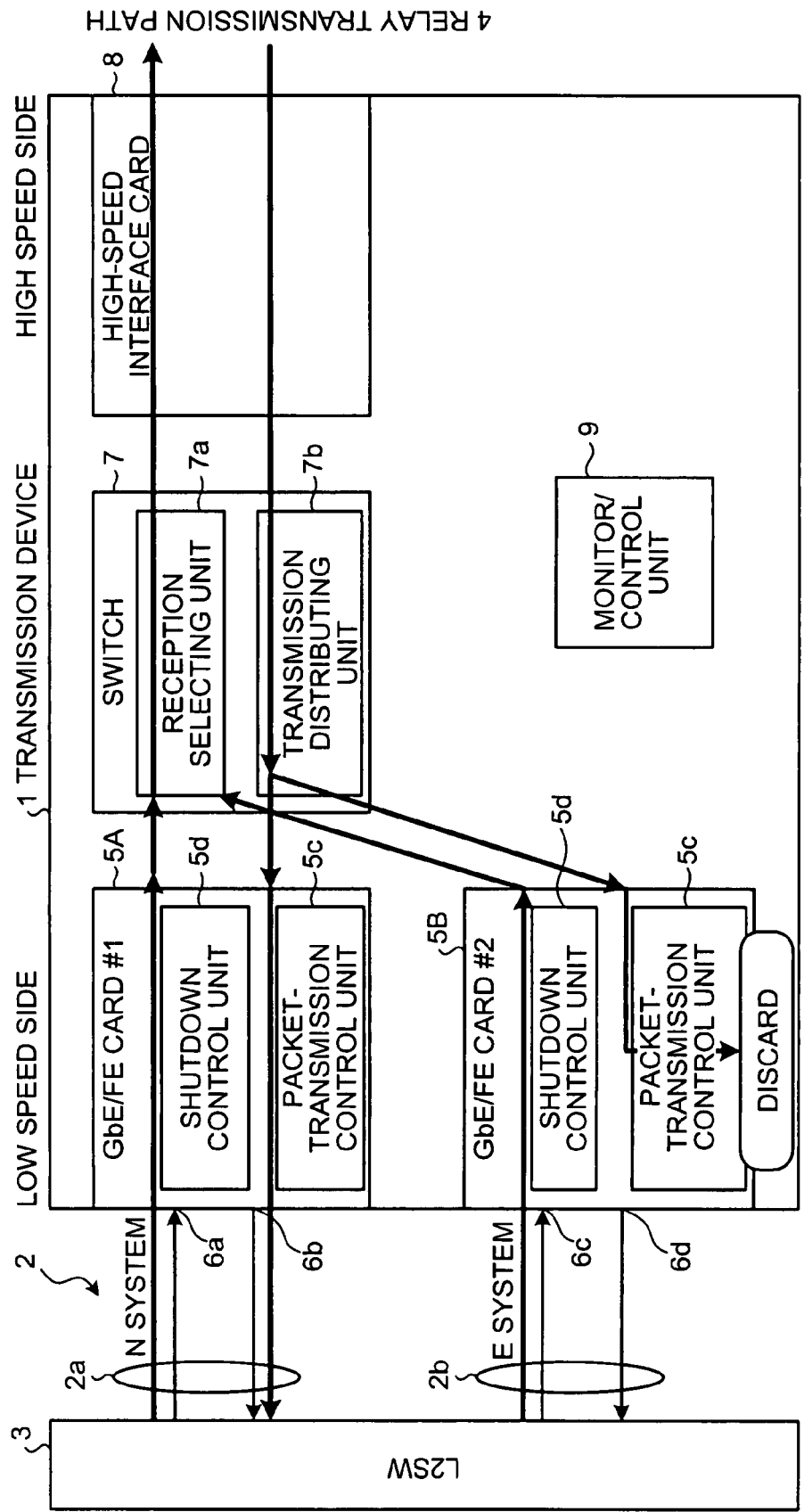
FIG. 1 is a block diagram of a transmission device according to embodiments of the present invention.

FIG. 1 is a block diagram of a transmission device 1 according to the embodiments of the present invention. The transmission device 1 is connected to a layer 2 switch (L2SW) 3 through a transmission path 2 at one side, and to a relay transmission path 4 at the other side. A terminal device and the like are connected to the layer 2 switch 3 through a subscriber network. The transmission device 1, the transmission path 2, and the layer 2 switch 3 are installed in a station of a communication carrier that provides wide-area layer 2 network services. The redundant configuration is to establish multiplexed routes of the transmission path 2 and to achieve switching of the routes within a section in the station.

In the transmission device 1, a plurality of low-speed interface cards (GbE card/FE card) 5 of GbE or FE are provided as interfaces of the layer 2 switch 3. For example, communication speed of 1000BASE-X(T) of GbE is 1 GBit/sec. Communication speed of 100BASE-TX of FE is 100 MBit/sec.

In the configuration shown in FIG. 1, at least two low-speed interface cards 5A and 5B are provided to achieve the redundant configuration. Each low-speed interface card 5 has an input port 6a and an output port 6b for packet communication, a packet-transmission control unit 5c and a shut-down control unit 5d. Under normal operation, the low-speed interface card 5A is connected to a transmission path 2a of an active system (N system) and the low-speed interface card 5B is connected to a transmission path 2b of a stand-by system (E system). Thus, the transmission path 2 on a side of the layer 2 switch 3 is formed in duplicate systems by the transmission path 2a of the active system and the transmission path 2b of the stand-by system.

A switch 7 is provided between the low-speed interface cards 5A and 5B and a high-speed interface card 8. The switch 7 includes a reception selecting unit 7a and a transmission distributing unit 7b. The reception selecting unit 7a selectively receives a transmission packet transmitted from the low-speed interface cards 5A and 5B, to transmit to the high-speed interface card 8. The transmission distributing unit 7b receives the transmission packet transmitted from the high-speed interface card 8, to selectively transmit to either one of the low-speed interface cards 5A and 5B. The reception selecting unit 7a and the transmission distributing unit 7b performs a switching operation to select either one of the low-speed interface cards 5A and 5B in accordance with a control by a monitor/control unit 9.

The high-speed interface card 8 performs generation of a transmission signal of the relay transmission path 4, such as a synchronous optical network (SONET), and conversion of signals. Conforming to a hierarchy multiplexing by synchronous digital hierarchy (SDH) defined by the International Telecommunication Union Telecommunication Standardization Sector (ITU-T), for example, when the interface is OC-192 (STM-64), the communication speed is 9.953280 GBit/sec. Alternatively, one compatible with a ring network such as SONET ring can be used.

The monitor/control unit 9 performs packet transmission selecting the low-speed interface 5A of the active system (N system) under normal operation. At this time, on a stand-by system (E system) side, the packet transmitted from the relay transmission path 4 is discarded, and packet transmission to the relay transmission path 4 is also stopped.

When failure such as line disconnection occurs in the transmission path 2a of the active system, the monitor/control unit 9 controls the shutdown control unit 5d of the low-speed interface card 5A to forcibly shut down the ports 6a and 6b, and the packet transmission of the transmission path 2a is stopped. Thereafter, the monitor/control unit 9 controls the switch 7 to switch the transmission path 2a to the transmission path 2b of the stand-by system, and starts packet transmission to the transmission path 2b of E system that has become the active system.

Figure 2:
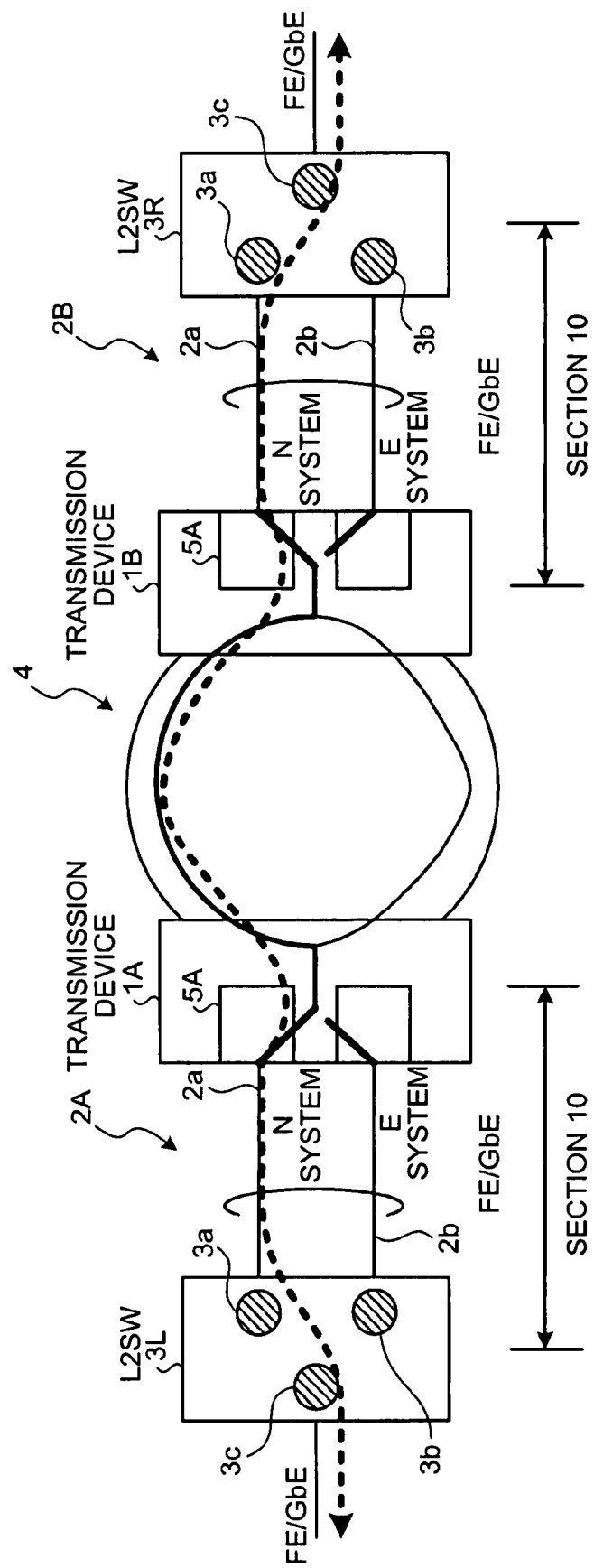
FIG. 2 is a schematic of a redundant configuration of the transmission device and a layer 2 switch under normal operation conditions.

FIG. 2 is a schematic of a redundant configuration of the transmission device and the layer 2 switch under normal operation. In the configuration shown in FIG. 2, the transmission devices 1 and the layer 2 switches 3 are symmetrically arranged relative to the relay transmission path 4. A transmission device 1A, a layer 2 switch 3L, and a transmission path 2A are installed in a station. Between the transmission device 1A and the layer 2 switch 3L, a redundant configuration with the transmission path 2A having at least two lines including an active system and a stand-by system is established. A section between the transmission device 1A and the layer 2 switch 3L inside the station is referred to as a section 10. Similarly, a transmission device 1B, a layer 2 switch 3R, and a transmission path 2B are installed in another station.

Under normal operation, communication using the low-speed interface card 5A of the transmission path 2a of the active system is established in the transmission path 2 (indicated by a dotted line in FIG. 2). In the layer 2 switch 3, two input/output ports 3a and 3b to be connected to the transmission paths 2a and 2b and one input/output port 3c on a terminal device side are set identically to be in the same VLAN or the like.

When the packet transmission is performed from the transmission device 1A to the transmission device 1B, the layer 2 switch 3 (3L, 3R) determines, by MAC address learning, a port from which the input packet is to be output. Since an output port of a packet that is received first has not yet been learned, the layer 2 switch 3L transmits this packet from all of the ports. Therefore, this packet is received in both the active system (N system) and the stand-by system (E system) in the transmission device 1A, and the packet received in the stand-by system is discarded. Thus, only the packet in the transmission path 2a in the active system is transmitted to the transmission device 1B through the relay transmission path 4.

Also in the transmission device 1B, the active system and the stand-by system are provided, and the transmission device 1B transmits the packet to the layer 2 switch 3R only through the transmission path 2a of the active system. Since MAC address learning has not been conducted yet in the layer 2 switch 3R, the packet is transmitted to all ports. As described, under normal operation, the packet transmitted from the transmission device 1A is transmitted to the transmission device 1B through the transmission path 2a of the active system.

When the packet transmission is performed from the transmission device 1B to the transmission device 1A, in the layer 2 switch 3R, the output port has been set to the port in the active system by the MAC address learning at the previous transfer. By this MAC address learning, the layer 2 switch 3R transmits the packet transmitted from a subscriber device to the transmission device 1B through the transmission path 2a of the active system. The transmission device 1B transmits this packet to the transmission device 1A through the relay transmission path 4.

In the transmission device 1A also, the packet is transmitted through the transmission path 2a of the active system. In the layer 2 switch 3L, MAC address learning is performed by receiving the packet through the port of the active system, and the packet is transmitted to a subscriber device. With the redundant configuration formed by the active system and the stand-by system provided in both of the transmission devices 1A and 1B, packet transmission is performed in the active system, packet transmission is stopped in the stand-by system, and the packet received in the stand-by system is discarded. Thus, the layer 2 switch 3 performs MAC address learning only at the port of the active system, and communication with packet transmission through the transmission path 2a of the active system is established.

Figure 3:
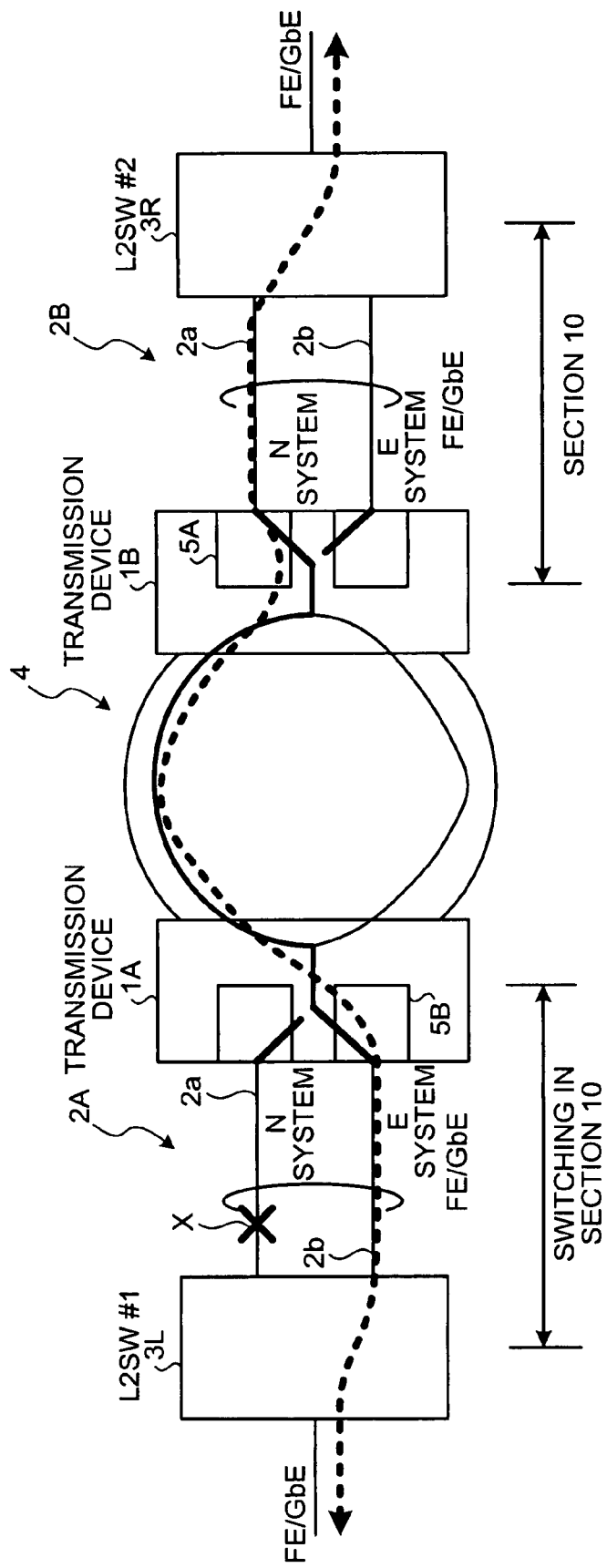
FIG. 3 is a schematic illustrating switching of routes between the transmission device and the layer 2 switch when the transmission path is disconnected.

FIG. 3 is a schematic illustrating switching of routes between the transmission device and the layer 2 switch when the transmission path is disconnected. A state where failure due to disconnection occurs at a point X shown in FIG. 3 in the transmission path 2a is explained.

The transmission device 1A and the layer 2 switch 3L respectively detect link down of the transmission path 2a. Specifically, link down is detected based on whether a link pulse (clock) is detected in the transmission path 2 connected through the ports. The monitor/control unit 9 (see FIG. 1) of the transmission device 1A controls a shutdown control unit 3d to shut down the port of the active system (N system), and controls the packet-transmission control unit 5c to stop transmission in optical transport. The shutdown of the port is forcibly performed when a predetermined time has elapsed. Since general-purpose products are used as the layer 2 switches 3 (3L, 3R), time required to detect link down is different in each of the layer 2 switches 3. Therefore, the time until the shutdown is performed is set relatively long. After the shutdown in the active system, the monitor/control unit 9 of the transmission device 1A instructs the switch 7 to switch routes. The switch 7 switches the transmission path 2*b* of the stand-by system (E system) to be the active system, and releases the stopped transmission of the port in E system, thereby enabling the packet transmission through the low-speed interface card 5B.

Moreover, when link down of the transmission path 2*a* is detected in the layer 2 switch 3L, the layer 2 switch 3L performs a MAC address flush. By the MAC address flush, port allocation data stored through the MAC address learning is deleted to recover an initial state in which MAC address learning is again necessary.

In the transmission device 1A, the transmission path 2*a* (N system) becomes the stand-by system, and the transmission path 2*b* (E system) has been switched to the active system. When a packet is transmitted from a subscriber device on a left side in FIG. 3 in this state, the layer 2 switch 3L transmits this packet from all of the ports since this packet is the first packet since the MAC address flush. However, because failure has occurred in the transmission path 2*a*, in an actual situation, the packet is transmitted through the transmission path 2*b*, and MAC address learning is performed at this time. In the transmission device 1A, the packet is received only through the active system (N system), and transmitted to the transmission device 1B.

In the transmission device 1B, the transmission path 2*a* of N system is used as the active system, and the packet is transmitted through the transmission path 2*a* to the layer 2 switch 3R. Similarly in packet transmission from the subscriber device on a right side in FIG. 3, a packet is transmitted through the transmission path 2*a* of N system to the transmission device 1B, and in the transmission device 1A, the received packet is transmitted through the transmission path 2*b* of E system being the active system to the layer 2 switch 3L. In the layer 2 switch 3L, based on the MAC address learning previously performed, transmission and reception of packets are performed through the transmission path 2*b* of E system. Thus, in the transmission path 2A, communication using the transmission path 2*b* of E system is established.

As described, even when failure occurs in the transmission path 2*a* of the active system between the transmission device 1A and the layer 2 switch 3L, the transmission device 1A can continue packet transmission, by switching the path to the transmission path 2*b* of the stand-by system. With such a redundant configuration, it becomes possible to maintain communication just by switching the transmission path 2 between the transmission device 1A and the layer 2 switch 3L, which is in the section 10. This section 10 in which the switching is carried out is within the station shown on the left side in FIG. 3, and since closed route switching inside the section 10 is possible, this route switching does not affect the network (relay transmission path 4) and the active system of the transmission device 1B in the other station. In addition, even if the failure occurred in the transmission path 2*a* of N system in the transmission path 2A is resolved, since the communication through the transmission path 2*b* of E system, which has been switched to the active system, has already been established, the communication line and the packet transmission are not affected.

In the above configuration, the layer 2 switch 3 connected to the transmission device 1 can be a general-purpose product capable of MAC address learning, and a special function is not required to achieve the above redundant configuration. This layer 2 switch 3 performs MAC address learning and MAC address flush following switching of the transmission path 2 on the side of the transmission device 1, and determines a transmission destination of packets. Therefore, according to the transmission device 1 having the above configuration, a redundant configuration can be formed using such a general-purpose layer 2 switch 3, and packet transmission can be continued even when failure occurs in the transmission path 2.

The switching of routes between the transmission device 1 and the layer 2 switch 3 can be selectively set to be non-revertive or revertive. When it is set to be non-revertive, once communication is established with the transmission path 2*b* of E system as the active system as shown in FIG. 3, even if failure in the transmission path 2*a* of N system is resolved and the transmission path 2*a* is recovered, communication is maintained with the transmission path 2*b* of E system currently being the active system.

On the other hand, when it is set to be revertive, if the transmission path 2*a* of N system is recovered, upon detecting link up of the transmission path 2*a*, the transmission path 2*b* of E system is forcibly shut down for a predetermined time, to change (revert) the active system from E system to N system. Recovery time for link up and a time period of the forcible shutdown can be changed by settings. Whether to revert the routes after route switching of the transmission path can be appropriately determined by an administrator.

Figure 4:
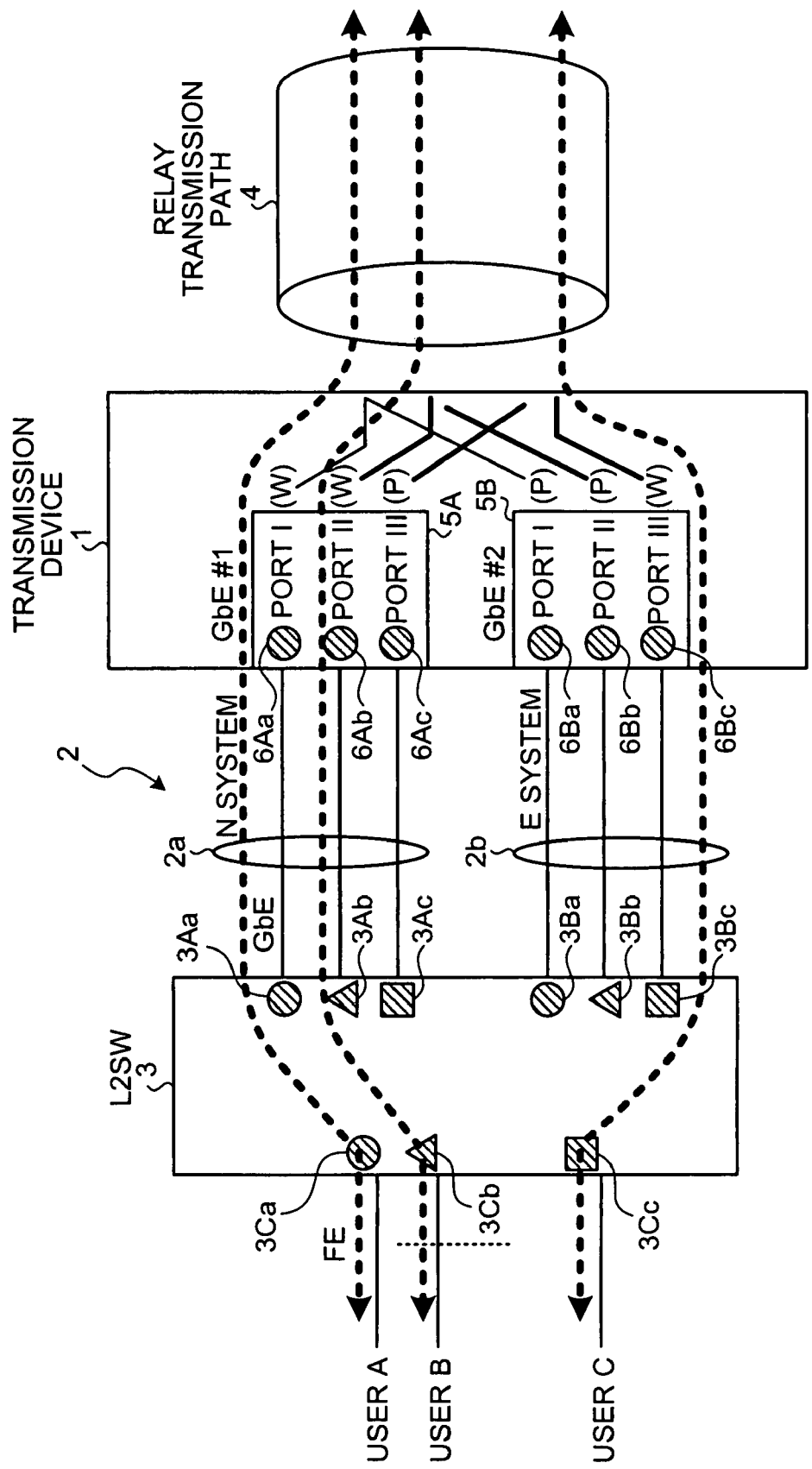
FIG. 4 is a schematic illustrating allocation of an active system and a stand-by system for lines used in the redundant configuration.

While in the above example, the redundant configuration in which the transmission path 2*a* of N system is set to the active system and the transmission path 2*b* of E system is set to the stand-by system has been explained, the redundant configuration is not limited thereto. FIG. 4 is a schematic diagram illustrating allocation of the active system and the stand-by system for lines used in the redundant configuration. As shown in FIG. 4, the transmission path 2 is composed of a plurality of the transmission paths 2*a* of N system and a plurality of the transmission paths 2*b* of E system. Corresponding to the number of paths of the transmission path 2, the low-speed interface cards 5A and 5B respectively have a plurality of ports 6*a* to 6*c* (when the number of ports is three). The layer 2 switch 3 has six ports (3 ports×2) on the side of the transmission device 1, and three ports on a side of the subscriber device. In this case, three subscriber devices can be connected. Usually, the low-speed interface card 5 (5A, 5B) has four ports.

When the subscriber devices are users A, B, and C, the active systems of all of the users A, B, and C are not necessarily required to all be the transmission paths 2*a* of N system. The active systems of the users A, B, and C can be set to the transmission path 2*a* or the transmission path 2*b* separately. In the allocation example shown in FIG. 4, the transmission device 1 sets the transmission path 2*a* as the active system for the user A, and the transmission path 2*b* as the stand-by system. In this case, for the user A, a port I (6Aa) of the low-speed interface card 5A is allocated for the active system (W), and a port I of the low-speed interface card 5B (6Ba) is allocated as the stand-by system (P). Corresponding to this allocation, in the layer 2 switch 3, for the user A, a port 3Aa, a port 3Ba, and a port 3Ca are set to be in the same VLAN. Thus, the layer 2 switch 3 performs MAC address learning for the user A, using these ports 3Aa, 3Ba, and 3Ca.

Similarly for the user B, a port II (6Ab) of the low-speed interface card 5A is allocated as the active system (W), and a port II (6Bb) of the low-speed interface card 5B is allocated as the stand-by system (P). Corresponding to this allocation, in the layer 2 switch 3, for the user B, a port 3Ab, a port 3Bb, and a port 3Cb are set to be in the same VLAN.

For the user C, the transmission path 2*a* is set to the stand-by system, and the transmission path 2*b* is set to the active system. In other words, a port III (6Bc) of the low-speed interface card 5B is allocated as the active system (W), and a port III (6Ac) of the low-speed interface card 5A is allocated as the stand-by system (P).

Corresponding to this allocation, in the layer 2 switch 3, for the user C, a port 3Ac, a port 3Bc, and a port 3Cc are set to be in the same VLAN.

As described above, the active system and the stand-by system of each user are set such that one of the transmission paths of N system and of E system is set to the active system, and the other one of the transmission paths of N system and E system is set to the stand-by system.

Figure 5:
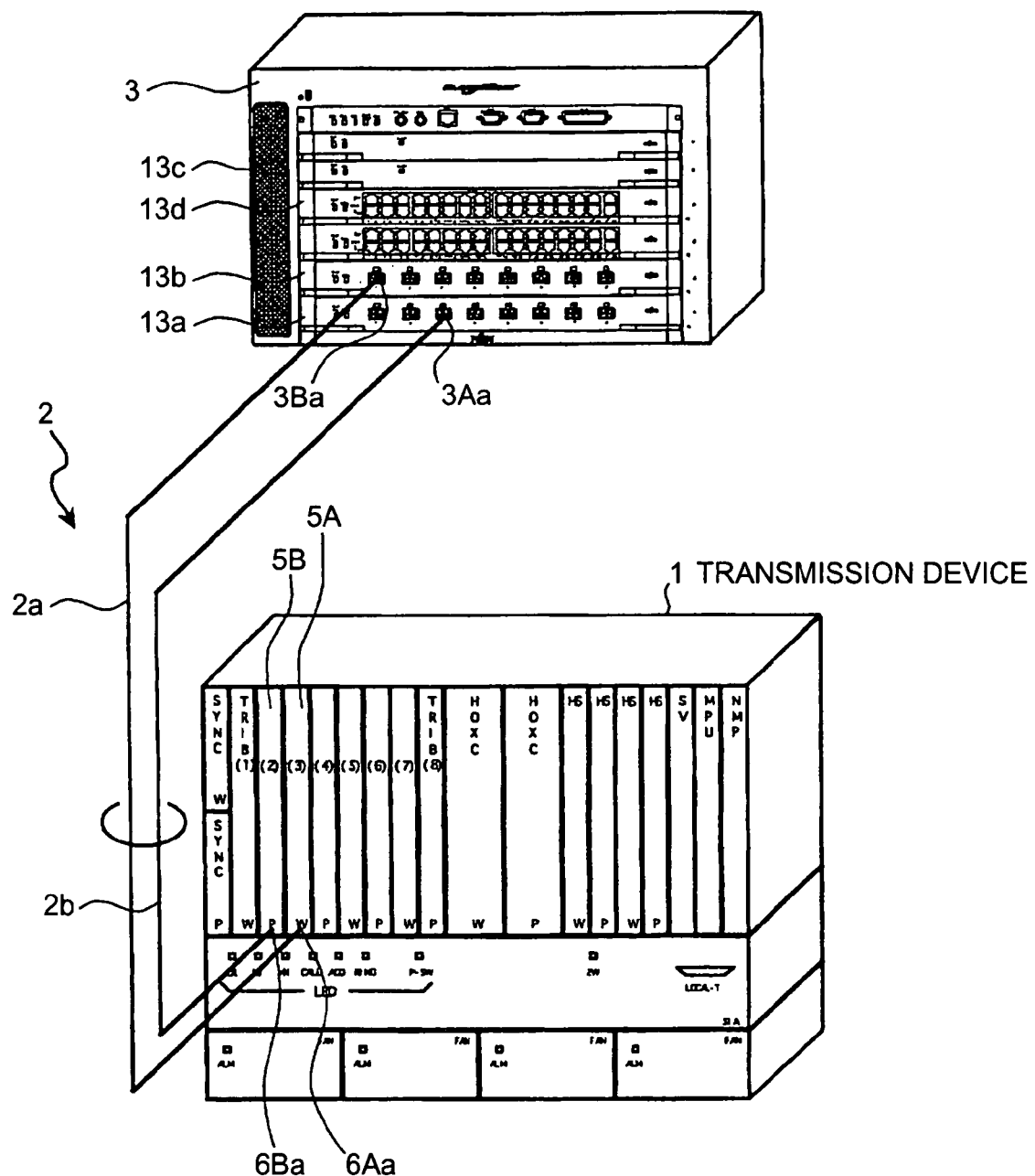
FIG. 5 is a schematic for explaining connection of transmission paths between the transmission device and the layer 2 switch.
Figure 6:
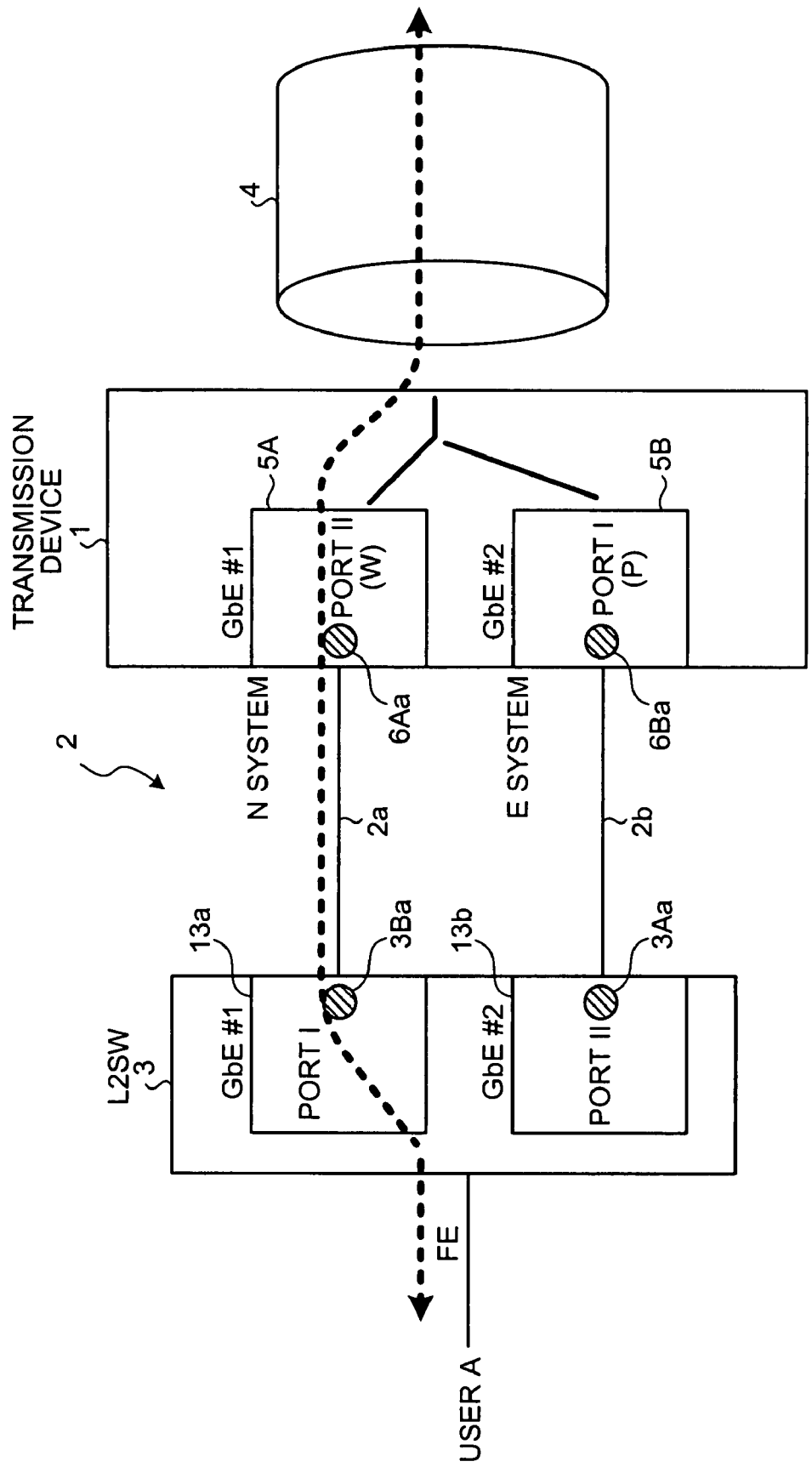
FIG. 6 is a schematic for explaining connection of the transmission paths between the transmission device and the layer 2 switch.

FIG. 5 is a perspective view of the transmission device and the layer 2 switch for explaining connection of the transmission paths there between, and FIG. 6 is a schematic for explaining the connection of the transmission paths between the transmission device and the layer 2 switch. FIGS. 5 and 6 illustrate the connection of the transmission path 2 in the redundant configuration formed for the user A described in FIG. 4.

By setting a redundancy function in the transmission device 1, a redundant configuration between different interface cards 13a and 13b can be achieved in the layer 2 switch 3. The transmission device 1 and the layer 2 switch 3 are connected using the transmission path 2a between the port 6Aa of the low-speed interface card 5A of the transmission device 1 and the port 3Aa of the interface card 13a as the active system. Moreover, the transmission path 2b between the port 6Ba of the low-speed interface card 5B and the port 3Bb of the port 13b of the interface card 13b is set to the stand-by system. The interface cards 13a and 13b have an optical signal input/output port of GbE, and an interface cards 13c and 13d have an electrical signal input/output port of FE.

With such a redundant configuration using the plurality of different interface cards 13a and 13b, even if failure occurs in one of the interface cards 13a, by switching lines, continuous operation is possible using the other interface card 13b. As described, the redundant configuration using an arbitrary port of the layer 2 switch 3 can be established, thereby coping with failure to improve reliability, and providing flexibility in line connection of the active system and the stand-by system.

Figure 7:
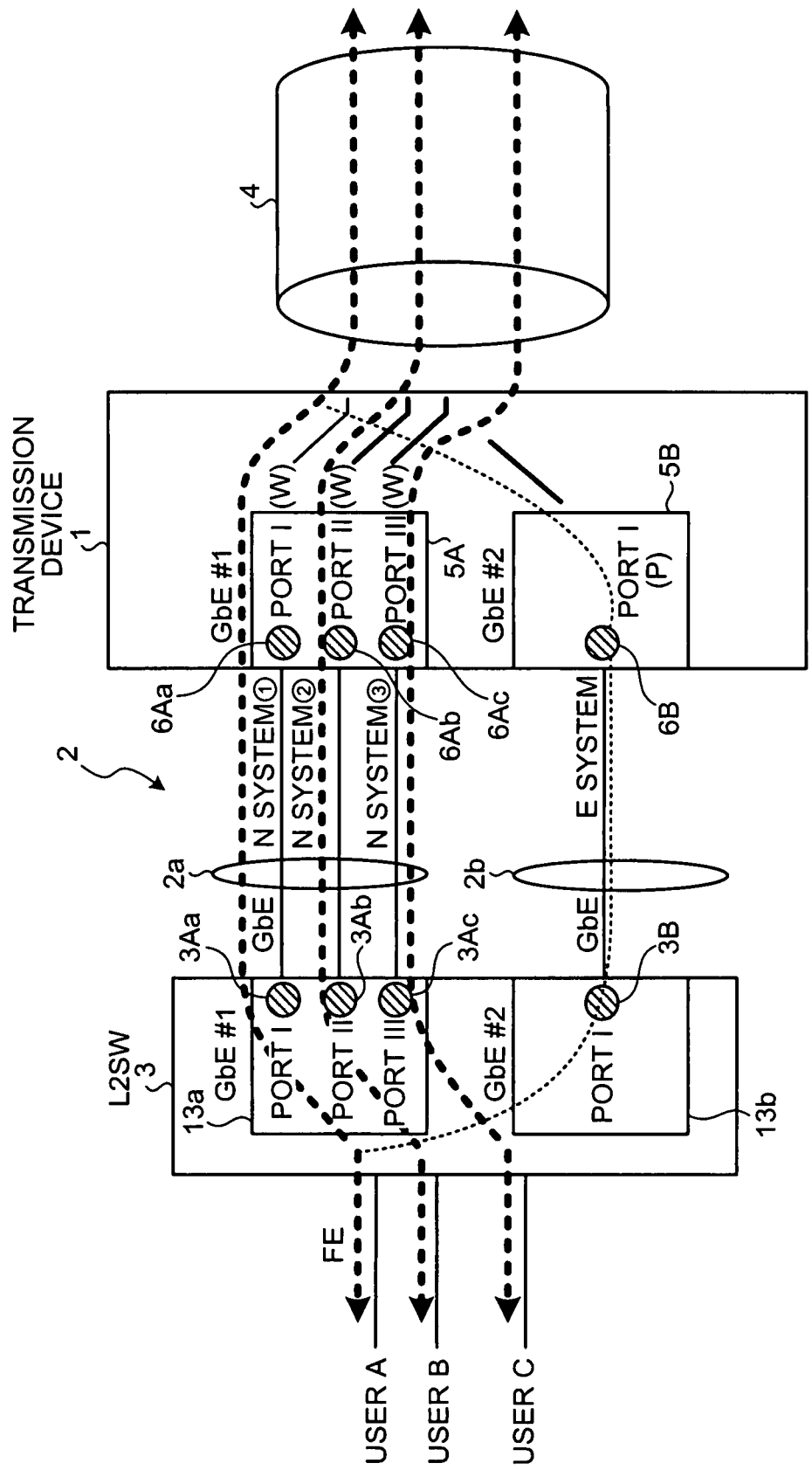
FIG. 7 is a schematic illustrating an N:1 redundant configuration.

FIG. 7 is a schematic diagram illustrating an N:1 redundant configuration as a modification of the redundant configuration according to the embodiments. When the low-speed interface cards 5A and 5B of the transmission device 1 respectively have a plurality of ports, the redundant configuration is not limited to the above configuration that is made redundant for each port, and it can be configured such that for the active system (W), each user is allocated with one port (and the transmission path 2), but for the stand-by system (P), one port (and the transmission path 2) is used commonly by more than one user. In the N:1 redundant configuration, the number of port of the active system is N and the number of port of the stand-by system is 1.

Specifically, three ports provided in the low-speed interface card 5A and the transmission paths 2a of N system are set as the active system (W) of three different users. On the other hand, for the stand-by system (P), only one port provided in the low-speed interface card 5B and a single line of the transmission path 2b of E system are used. In this case, the 3:1 redundant configuration is established.

When the 3:1 redundant configuration is formed, the transmission path 2b of the stand-by system can be allocated to one specific user, or to the aforementioned three users, thereby enabling operation according to an arbitrary setting. As shown in FIG. 7, when the service is to be continued in case of failure only for the user A, the transmission path 2b of the stand-by system and the port 3B of the layer 2 switch 3 are provided to the user A. Thus, the service can be provided to the user A at an equivalent line speed (frequency band) to the line speed of the transmission path 2a being the active system at the time of occurrence of failure, by using the transmission path 2b of the stand-by system.

On the other hand, although not shown, when the service is to be continued to be provided when failure occurs in the transmission paths 2a for all of the users, the three users A, B, and C all use a single line of the transmission path 2b. When there is no failure in the transmission paths 2a of the active system, the line speed of the transmission path 2a is ensured for each of the users A, B, and C; however, if the single line of the transmission path 2b is used by all of the users A, B, and C at the same time, the line speed can decrease (degenerate). If failure occurs only in the transmission path 2a for the user A among the transmission paths 2a of the active system, the transmission path 2b of the stand-by system is allocated only to the user A. Therefore, the service can be provided to the users B and C at the ensured line speed through the transmission path 2a. However, if failure of the low-speed interface card 5A occurs, and as a result, the transmission path 2a of the active system cannot be used by any of the users A, B, and C, the services for all of the users A, B, and C are degenerated. Therefore, in the N:1 redundant configuration, port setting based on a service contract for each user at the time of occurrence of failure and allocation of the transmission path 2b of the stand-by system are required.

According to the above configuration, the number of the transmission path 2b of the stand-by system and the number of ports in the low-speed interface card 5B can be reduced, and saved paths (and ports) obtained as a result of this reduction can be used to provide services to other users. Furthermore, according to the N:1 redundant configuration, installation cost can be reduced compared to a 1:1 redundant configuration.

Figure 8:
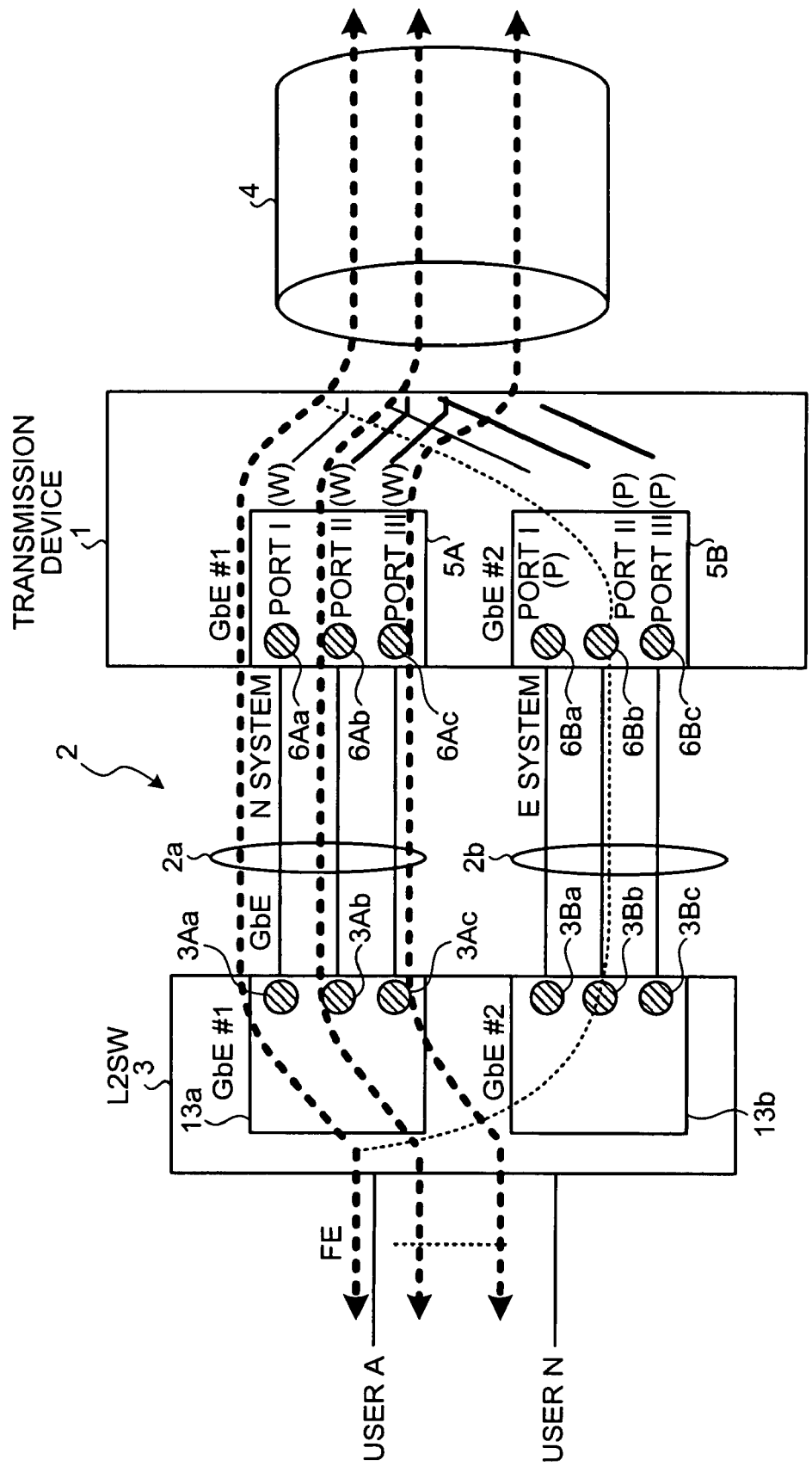
FIG. 8 is a schematic illustrating a combination of link aggregation using a plurality of transmission paths and the redundant configuration.

FIG. 8 is a schematic diagram illustrating a combination of the redundant configuration and link aggregation using a plurality of transmission paths. The link aggregation is defined by IEEE802.1ad, and is a function of obtaining a line speed faster than the physical speed of a single line by using more than one transmission path. Under normal operation, by the link aggregation using both the transmission paths 2a of N system and the transmission paths 2b of E system, the line speed is improved. When failure occurs in either one of the transmission paths 2a and 2b being the active system, the other one of the transmission paths 2a and 2b without failure is used alone.

For example, in the allocation of the transmission path 2 for the user A, the link aggregation using the port 3Aa of the interface card 13a and the port 3Bb of the interface card 13b is configured. Since the interface cards shown in FIG. 8 are of GbE, under normal operation, it is possible to obtain the line speed of 2 GBit/sec (1 GBit/sec×2), which is the total of two line speeds. When failure occurs in the transmission path 2a of the active system, the service can be continued using only the transmission path 2b. At this time, the line speed is reduced by half to 1 GBit/sec because only one line, the transmission path 2b, is used, but the service can be provided continuously. While the conventional link aggregation functions use a plurality of ports in the single interface card 13a, according to the embodiments of the present invention, such link aggregation can be configured to have a function of MAC address learning at the layer 2 switch 3 by allocating a port to each user, and use a plurality of ports provided in the multiple interface cards 13a and 13b.

Figure 9:
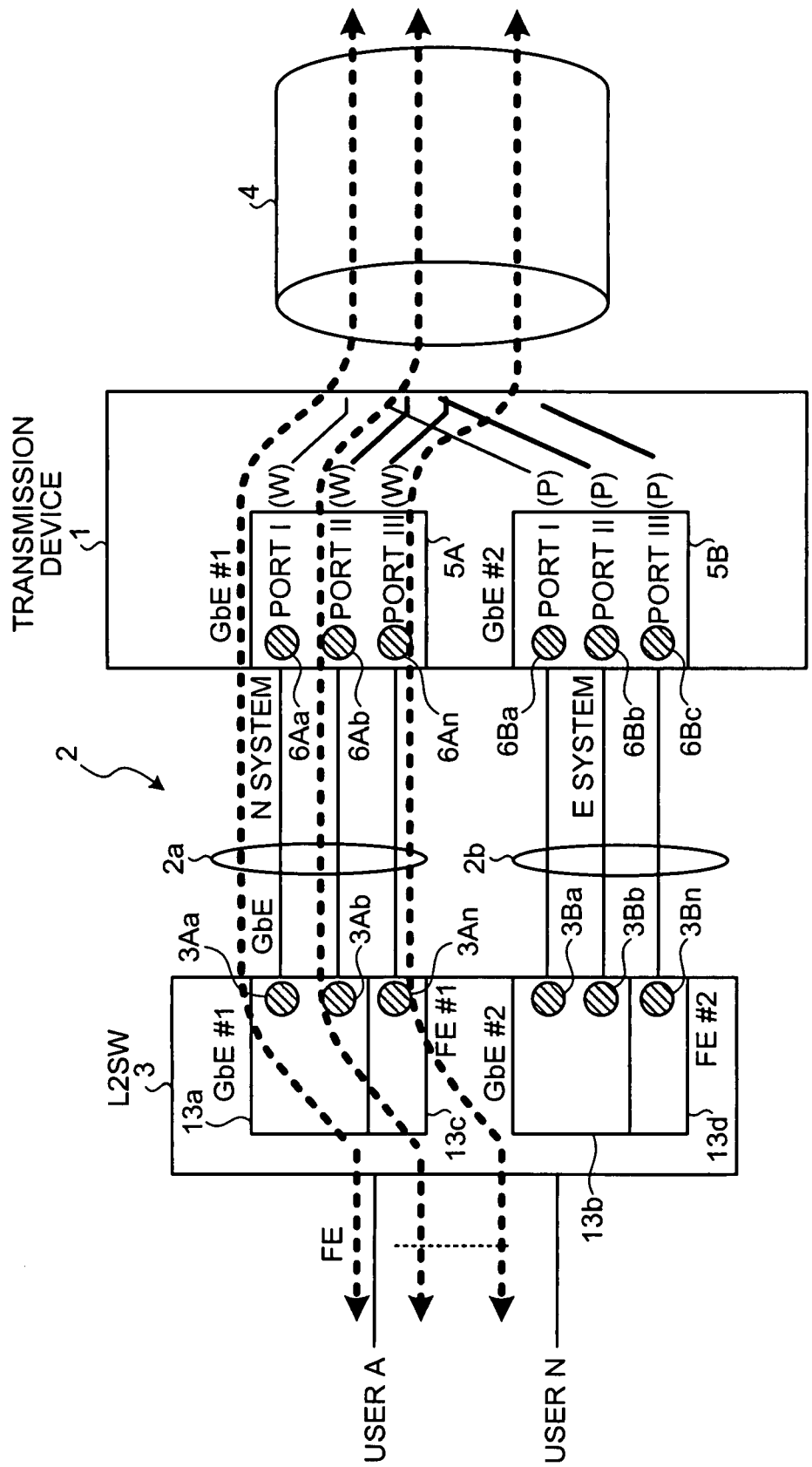
FIG. 9 is a schematic illustrating another combination of the link aggregation using a plurality of transmission paths and the redundant configuration.

FIG. 9 illustrates another combination of the redundant configuration and the link aggregation using a plurality of transmission paths. The function of link aggregation is achieved by using two to eight lines of the transmission path 2 in an actual condition. In the example shown in FIG. 9, the link aggregation function is achieved using three lines of the transmission paths 2a of N system as the active system (W), and three lines of the transmission path 2b of E system as the stand-by system (P).

Specifically, in the layer 2 switch 3, the interface cards 13a and 13b having optical signal input/output ports of GbE and the interface cards 13c and 13d having electrical signal input/output ports of FE are provided. The appearance of the device is the same as that shown in FIG. 5. The two ports 3Aa and 3Ab of the interface card 13a are allocated to two lines of GbE, thereby obtaining the speed of 2 GBit/sec. Further, one port 3An of the interface card 13c is allocated to one line of FE, thereby obtaining the speed of 100 MBit/sec. These ports are provided to the user A. Thus, the total line speed using the transmission paths 2a as the active system becomes 2.1 GBit/sec.

Similarly, in the transmission paths 2b, the two ports 3Ba and 3Bb of the interface card 13b are allocated to two lines of GbE, thereby obtaining the speed of 2 GBit/sec. Moreover, one port 3Bn of the interface card 13d is allocated to one line of FE, thereby obtaining 100 MBit/sec. These ports are provided to the user A as the stand-by system. Thus, the total line speed of 2.1 GBit/sec can be ensured also for the transmission paths 2b used as the stand-by system. Accordingly, it becomes possible to ensure continuation of the communication service by using the transmission path 2b of the stand-by system when failure occurs in the transmission path 2a of the active system, and to ensure the communication speed (2.1 GBit/sec) by the link aggregation, even when failure occurs.

Figure 10:
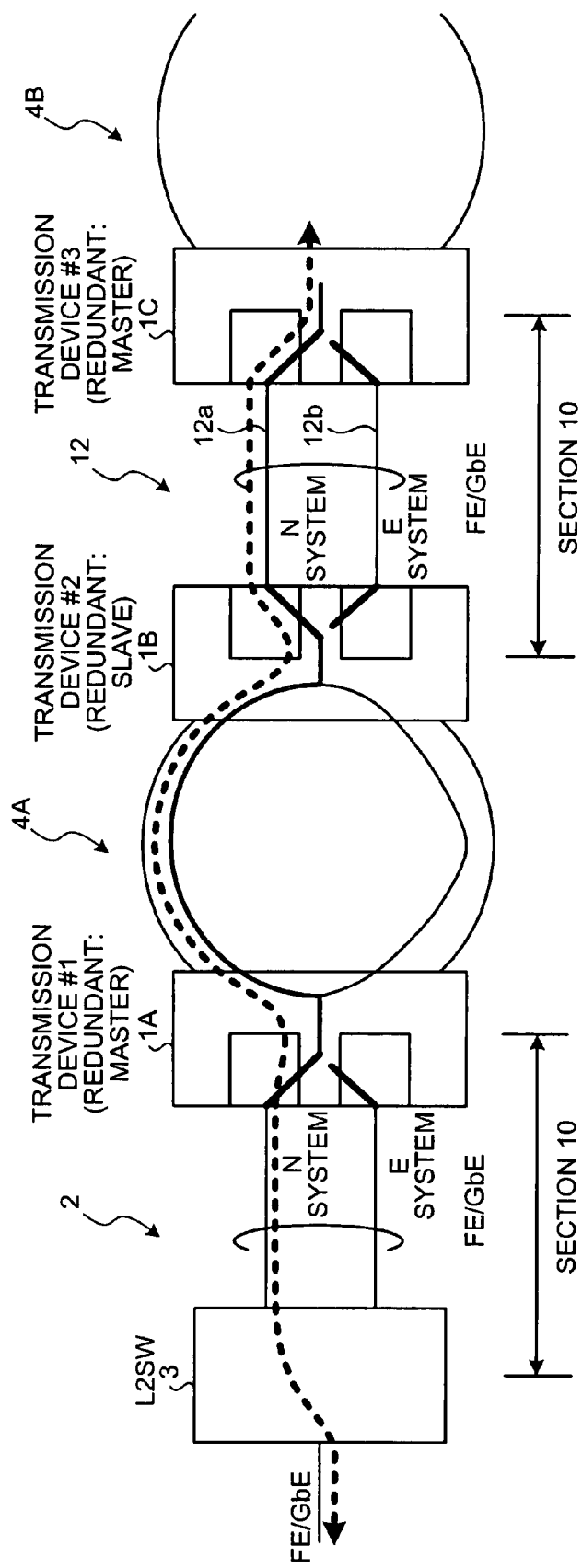
FIG. 10 is a schematic for explaining application of the redundant configuration according to the embodiments to back-to-back connection.

FIG. 10 illustrates a redundant configuration in which the transmission device 1B and a transmission device 1C are connected in a back-to-back configuration. The transmission device 1B and the transmission device 1C are installed in the same station. The back-to-back connection is an arrangement to connect the transmission device 1B and the transmission device 1C that are connected to relay transmission paths 4A and 4B, respectively.

In the back-to-back connection, when a switching operation of the redundant configuration is performed in the transmission device 1B and the transmission device 1C, system inconsistency can occur. To solve this problem, master/slave setting is carried out on the transmission device 1B and the transmission device 1C to perform the switching operation. A switching operation between transmission paths 12a and 12b that is required due failure in a transmission path 12 is performed mainly by the transmission device 1C set to the master. The transmission device 1B set to the slave is configured to follow the switching operation performed by the transmission device 1C, thereby preventing the system inconsistency. The transmission device 1A is set to the master when connected to the layer 2 switch 3.

When the redundant configuration is initially set, the shutdown control unit 5d (see FIG. 1) provided in the transmission device 1C being the master performs forcible shutdown on a port of E system set to the stand-by system for a predetermined time. Thus, systems of the active system and the stand-by system can be matched. Moreover, when an instantaneous power cut occurs in the transmission device 1B being the slave, system inconsistency can occur between the transmission devices 1A and 1C connected thereto after the transmission device 1B recovers from this power cut. Therefore, when recovered from the power cut, the transmission device 1B forcibly shuts down the ports of the stand-by system for a predetermined time, thereby matching the systems.

As described above, when the transmission devices 1B and 1C that are connected in the back-to-back configuration have a function of performing the master/slave setting and are connected to the layer 2 switch 3, the switching operation is mainly performed based on the setting of the master. When the transmission devices are connected in the back-to-back configuration, the transmission device 1C is set to the master and the other transmission device 1B is set to the slave. By such settings, the redundant configuration becomes applicable to the back-to-back connection of the transmission devices 1B and 1C. Even in the redundant configuration applied to the back-to-back connection, the closed route switching can be performed within the section 10, therefore, not affecting the transmission device 1A.

As described above, the transmission device 1 according to the embodiments of the present invention is configured to automatically execute route switching of the transmission paths in the redundant configuration based on detection of link down. It is not limited to the automatic execution, and it can be configured to execute the route switching based on a control (command switching) by an operation system (not shown). Generally, route switching is defined by ITU-T G.783 or by Telcordia GR-253-CORE.

The command switching is executed by sequentially performing the following controls 1 to 4. A procedure in the command switching is almost the same as a procedure in the automatic execution, and is explained below.

1. A forcible shutdown control is performed for a predetermined time on a port of N system (active system) so that the layer 2 switch 3 recognizes that the switching has been performed, and the layer 2 switch 3 is caused to perform the MAC address flush.

2. A packet-transmission stop control is performed on the port of N system (active system) to control the layer 2 switch 3 to stop packet transmission.

3. In the transmission device 1, switching from N system to E system is performed. Thus, N system becomes the stand-by system and E system becomes the active system.

4. In the transmission device 1, the stopped transmission of packets in E system that has become the active system is released, and the packet transmission is started in the layer 2 switch 3.

By sequentially performing the above controls 1 to 4, the command switching is executed. By this command switching, operators can control the route switching of the transmission path 2 at the time of occurrence of failure through the operation system.

Figure 11:
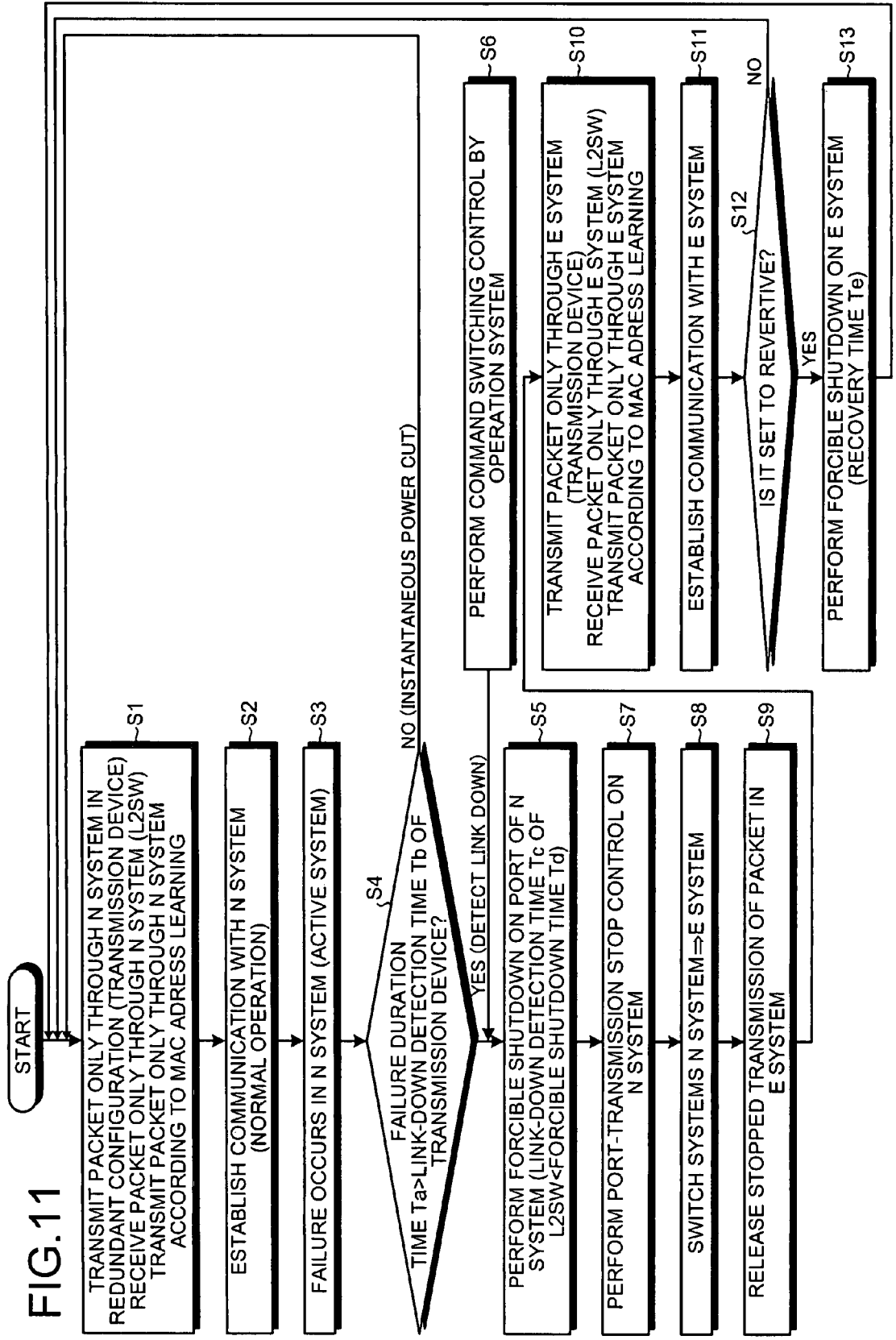
FIG. 11 is a flowchart of route switching in the redundant configuration with the transmission device according to the embodiments.
Figure 12:
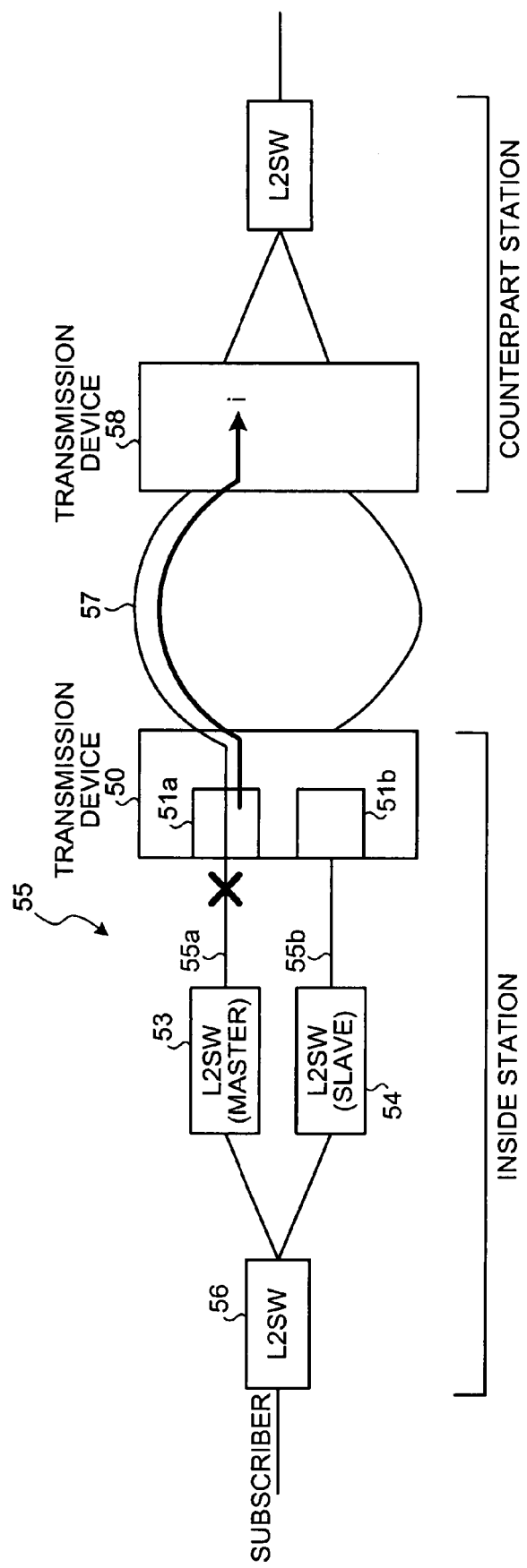
FIG. 12 is a schematic of a conventional redundant configuration using a plurality of layer 2 switches.
Figure 13:
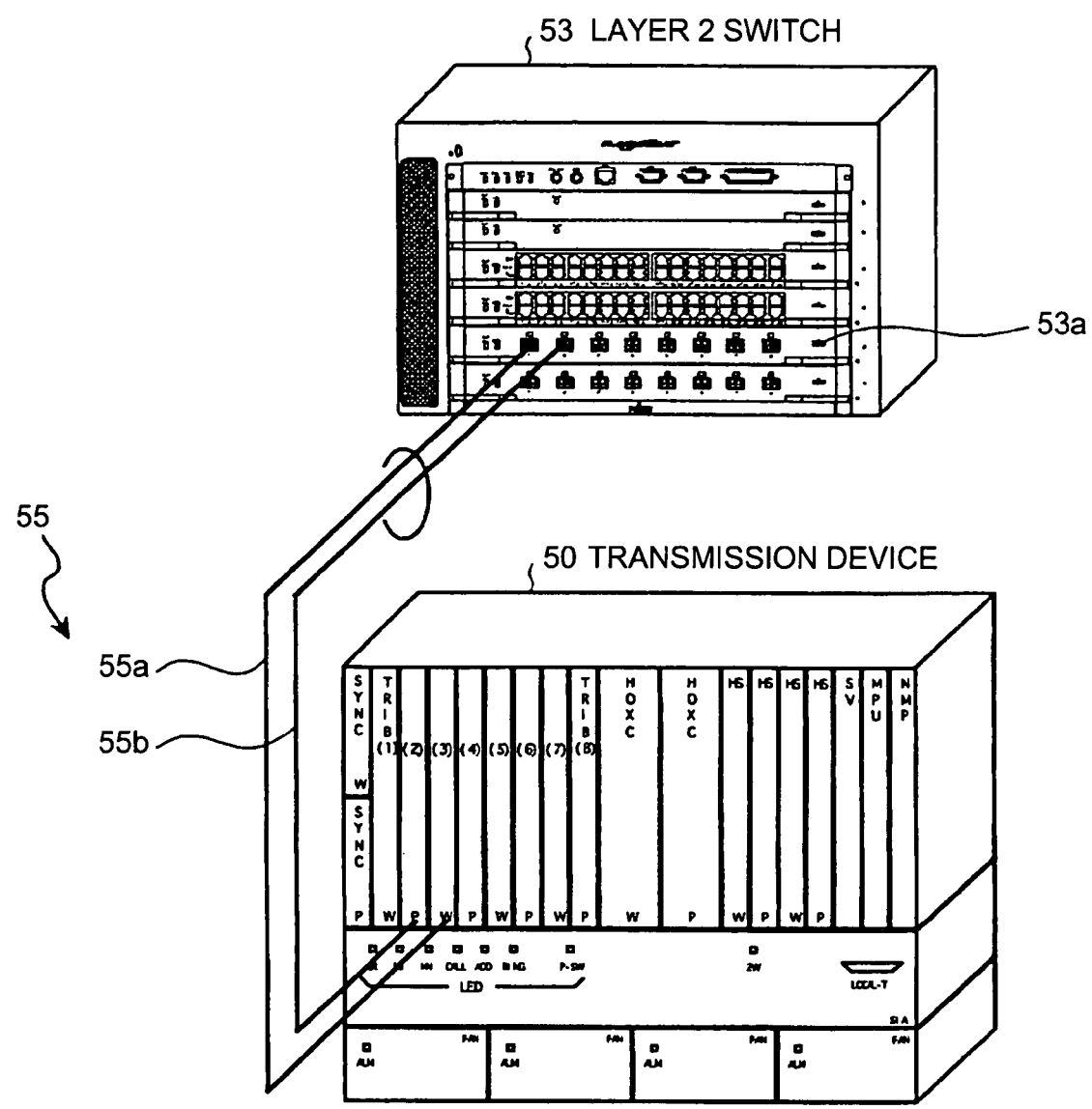
FIG. 13 is a schematic of link aggregation by a layer 2 switch.
Figure 14:
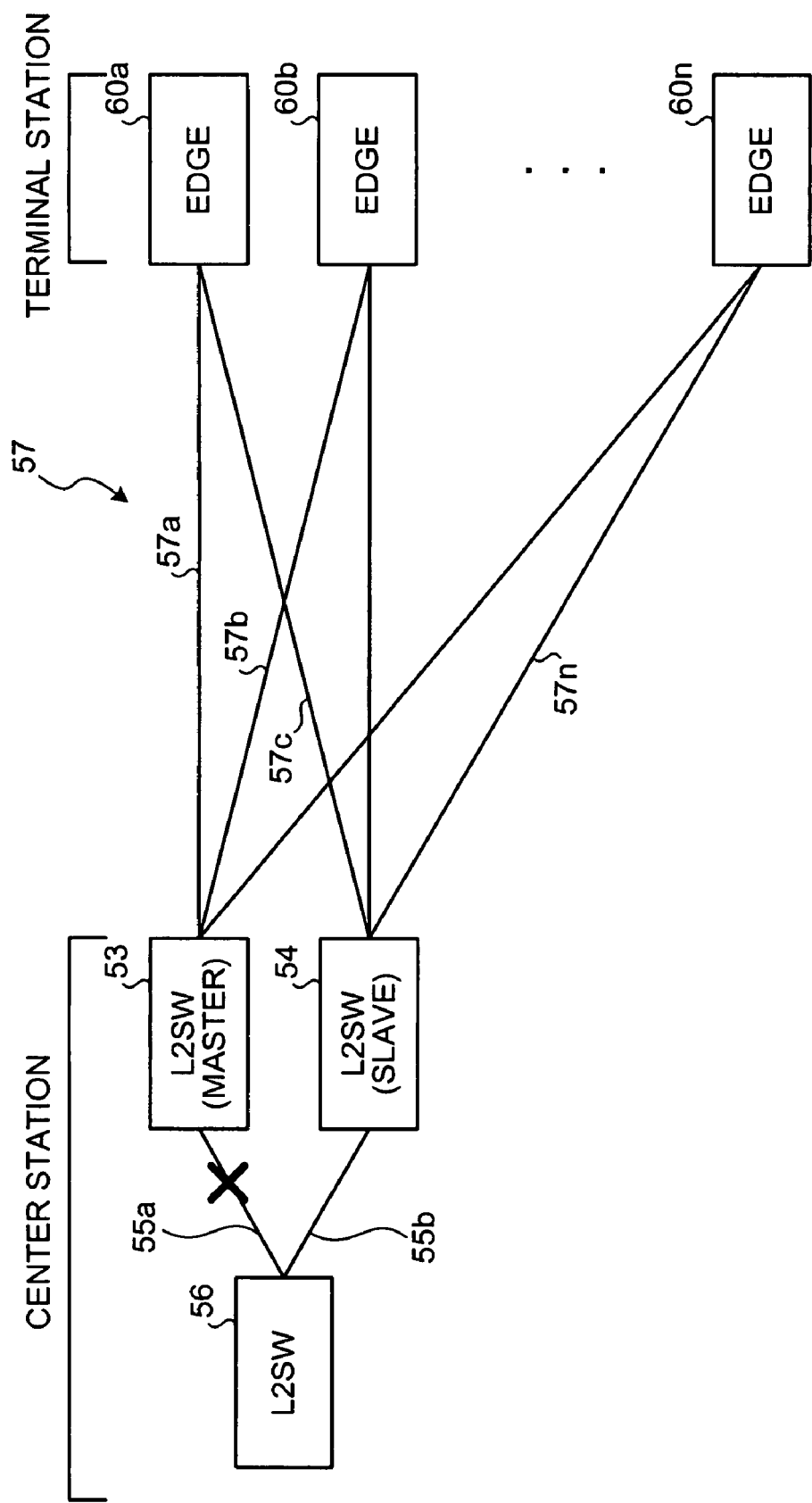
FIG. 14 is a schematic of route switching when failure occurs.

FIG. 11 is a flowchart of the route switching in the redundant configuration with the transmission device 1. In FIG. 11, controls based on the command switching control and the revertive setting are described. Explanation is given referring to the configuration shown in FIG. 1.

First, the transmission device 1 transmits a packet only through the transmission path 2a of N system that is set to the active system in the redundant configuration. The layer 2 switch (L2SW) 3 receives the packet only in N system, and according to the MAC address learning based on this packet reception, the layer 2 switch 3 transmits the packet only in N system (step S1). Thus, the transmission device 1 establishes communication using N system as the active system (step S2). At this time, the transmission path 2b of E system is used as the stand-by system, and packet transmission is stopped.

Assuming that failure then occurs in the transmission path 2a of N system set to the active system (step S3). In this case, the transmission device 1 determines whether a failure duration time Ta has exceeded a link-down detection time Tb (step S4). When the failure duration time Ta is equal to or less than the link-down detection time Tb (Ta<Tb) (step S4: NO), the transmission device 1 determines the failure as instantaneous power cut, and keeps N system as the active system without switching the transmission path 2*a*, and the process returns to step S1. The layer 2 switch 3 performs the following different operations 1 and 2 according to link down detection that is set relative to the failure duration time Ta.

1. In the layer 2 switch 3, it is determined that link down has occurred based on the failure duration time Ta, and MAC address flush is performed on the port of N system set to the active system. However, since the transmission device 1 maintains the transmission path 2*a* of N system as the active system, this only brings back to the initial condition and the communication through the transmission path 2*a* of N system is established.

2. In the layer 2 switch 3, link down is not detected based on the failure duration time Ta. In this case, this layer 2 switch 3 maintains the current condition and keeps the communication through the transmission path 2*a* of N system.

On the other hand, when the failure duration time Ta exceeds the link-down detection time Tb (Ta>Tb) (step S4: YES), the transmission device 1 determines that link down is detected. The transmission device 1 performs forcible shutdown on a port of N system (port of the low-speed interface card 5A connected to the transmission path 2*a* in FIG. 1) (step S5). The forcible shutdown is performed for a forcible shutdown time Td that is set to be longer than a link-down detection time Tc of the layer 2 switch 3 (Tc<Td). This enables the layer 2 switch 3 to detect link down stably, thereby ensuring performance of the MAC address flush on the port of N system. The forcible shutdown of the port of N system performed at step S5 is similarly performed in the case of the command switching control (step S6).

Thereafter, the transmission device 1 performs the transmission stop control on the port connected to the transmission path 2*a* of N system (step S7). The transmission device 1 then switches the active system from N system to E system (step S8). Accordingly, the transmission path 2*b* of E system becomes the active system, and the transmission path 2*a* of N system becomes the stand-by system.

Thereafter, the transmission device 1 releases the stopped transmission of packets of the transmission path 2*b* of E system that has become the active system (step S9). The transmission device 1 transmits packets only through the transmission path 2*b* of E system. At this time, the layer 2 switch 3 receives packets only through the transmission path 2*b* of E system, and transmits packets through the port of E system by MAC address learning (step S10). Thus, communication is established through the transmission path 2*b* of E system between the transmission device 1 and the layer 2 switch 3 (step S11).

It is then determined whether the revertive setting is applied that determines whether to revert the path during the communication through the transmission path 2*b* of E system (step S12). When the revertive setting is not applied (step S12: NO), even if failure occurred in N system is resolved, communication using the transmission path 2*b* of E system as the active system is maintained (return to step S1 but the active system this time is the transmission path 2*b*). On the other hand, when the revertive setting is applied (step S12: YES), if failure in N system is resolved, the transmission path 2*b* of E system currently being the active system is forcibly shut down when a recovery time Te has elapsed since detection of link up in the transmission path 2*a* of N system (step S13). The recovery time Te is arbitrarily set. The forcible shutdown time Td is set to be longer than the link-down detection time Tc (Tc<Td) as described at step S5. Thus, the transmission path 2*a* of N system is switched to the active system and the transmission path 2*b* of E system is switched to the stand-by system.

According to the embodiments described above, a redundant configuration is formed between a transmission device and a layer 2 switch, thereby enabling to continue communication even when failure occurs in a active system, by using a stand-by system. At this time, the transmission device performs switching within a section between the transmission device and the layer 2 switch without affecting a network or other transmission devices. Therefore, operation management of a network is facilitated. Furthermore, the redundant configuration can be formed with a general-purpose layer 2 switch that is provided by various manufacturers.

The present invention is not limited to the embodiments described above, and various modifications can be applied. While in the configuration of the transmission device 1 shown in FIG. 1, for example, the high-speed interface card 8 and the switch 7 are arranged in a single structure, the high-speed interface card 8 and the switch 7 can be arranged in a multiple structure according to multiplication of the relay transmission path 4.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A transmission system comprising:
   a first transmission device;
   a second transmission device;
   a first layer 2 switch; and
   a second layer 2 switch, wherein
   the first transmission device includes:
      a first interface unit that is connected to the first layer 2 switch through a first transmission path functioning as an active path,
      a second interface unit that is connected to the first layer 2 switch through a second transmission path functioning as a stand-by path, and
      a first control unit that switches, when failure occurs in the first transmission path, the first transmission path from the active path to the stand-by path and the second transmission path from the stand-by path to the active path, and
   the second transmission device includes:
      a third interface unit that is connected to the second layer 2 switch through a third transmission path functioning as the active path,
      a fourth interface unit that is connected to the second layer 2 switch through a fourth transmission path functioning as the stand-by path, and
      a second control unit that maintains, even when the failure occurs in the first transmission path, the third transmission path as the active path and the fourth transmission path as the stand-by path.

2. The transmission system according to claim 1, wherein the first transmission device further includes a switch that selects any one of the first interface unit and the second interface unit under control of the first control unit.

3. The transmission system according to claim 1, wherein the first control unit controlled by an operation system connected thereto.

4. The transmission system according to claim 1, wherein the first transmission device further includes a setting unit that stores revert setting that indicates whether to revert the first transmission path to the active path and the second transmission path to the stand-by path when the failure is resolved.

5. The transmission system according to claim 4, wherein the first control unit reverts the first transmission path to the active path and the second transmission path to the stand-by path after a predetermined recovery time elapses.

6. The transmission system according to claim 1, wherein when switching the first transmission path from the active path to the stand-by path, the first control unit shuts down a port of the first interface unit connected to the first transmission path for a forcible shutdown time that is longer than a link-down detection time of the first layer 2 switch.

7. The transmission system according to claim 1, wherein the first transmission device and the first layer 2 switch are connected through a plurality of first transmission paths functioning as active paths and a plurality of second transmission paths functioning as stand-by paths.

8. The transmission system according to claim 1, wherein
the first transmission device and the first layer 2 switch are connected through a plurality of first transmission paths and a plurality of second transmission paths, and
an i-th first transmission path and a j-th first transmission path function as the active path and the stand-by path, respectively, while an i-th second transmission path and a j-th second transmission path function as the stand-by path and the active path, respectively, where i and j are positive integers.

9. The transmission system according to claim 1, wherein the first transmission device and the first layer 2 switch are connected through N first transmission paths functioning as active paths and one second transmission path functioning as the stand-by path, where N is a positive integer larger than one.

10. The transmission system according to claim 1, wherein each of the first interface unit and the second interface unit is an interface card compatible with the first layer 2 switch.

11. The transmission system according to claim 7, wherein a link aggregation is configured by some or all of the first transmission paths functioning as the active paths.

12. The transmission system according to claim 7, wherein a link aggregation is configured by some or all of the second transmission paths functioning as the stand-by paths.

13. The transmission system according to claim 1, wherein
the first interface unit includes a first port and a second port connected to the first layer 2 switch through the first transmission path and the second transmission path, respectively, and
the first port and the second port are provided within a single interface card that functions as both the first interface unit and the second interface unit, or in different interface cards that respectively function as the first interface unit and the second interface unit.

14. The transmission system according to claim 13, wherein the first interface unit is composed of a plurality of different interface cards.

15. The transmission system according to claim 1, wherein when the first transmission device and the second transmission device are connected through back-to-back connection, the first control unit determines which one functions as a master and the other functions as a slave.

16. A route switching method for a transmission system that includes a first transmission device, a second transmission device, a first layer 2 switch and a second layer 2 switch, the method comprising:
setting a first transmission path and a second transmission path through which the first transmission device is connected to the first layer 2 switch as an active path and a stand-by path, respectively;
setting a third transmission path and a fourth transmission path through which the second transmission device is connected to the second layer 2 switch as an active path and a stand-by path, respectively, and
switching, when failure occurs in the first transmission path, the first transmission path from the active path to the stand-by path and the second transmission path from the stand-by path to the active path, while maintaining the third transmission path as the active path and the fourth transmission path as the stand-by path.

17. The route switching method according to claim 16, wherein the switching is controlled by an external operation system.

18. The route switching method according to claim 16, further comprising:
setting whether to revert the first transmission path to the active path and the second transmission path to the stand-by path when the failure is resolved.

* * * * *